US008160486B2

(12) United States Patent
Inoue et al.

(10) Patent No.: US 8,160,486 B2
(45) Date of Patent: Apr. 17, 2012

(54) BLADE FOR ELECTROPHOTOGRAPHIC APPARATUS, AND METHOD OF PRODUCING THE SAME

(75) Inventors: Shoji Inoue, Ushiki (JP); Toshiro Uchida, Toride (JP); Taku Hatanaka, Moriya (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 815 days.

(21) Appl. No.: 12/166,914

(22) Filed: Jul. 2, 2008

(65) Prior Publication Data

US 2009/0022530 A1 Jan. 22, 2009

(30) Foreign Application Priority Data

Jul. 18, 2007 (JP) ................................ 2007-186880

(51) Int. Cl.

*G03G 21/00* (2006.01)
*B32B 27/40* (2006.01)
*B29C 65/00* (2006.01)
*B29C 70/68* (2006.01)

(52) U.S. Cl. .................. 399/350; 428/423.1; 264/279.1; 264/233

(58) Field of Classification Search ............... 428/423.1; 264/233, 279.1; 399/350
See application file for complete search history.

(56) References Cited

U.S. PATENT DOCUMENTS

| | | | | |
|---|---|---|---|---|
| 5,835,838 | A * | 11/1998 | Yu | 399/350 |
| 5,939,486 | A * | 8/1999 | Yu | 524/722 |
| 6,002,911 | A | 12/1999 | Suzuki et al. | 399/350 |
| 6,703,472 | B2 | 3/2004 | Miura et al. | |
| 2006/0229425 | A1 | 10/2006 | Inoue et al. | |

FOREIGN PATENT DOCUMENTS

| | | | |
|---|---|---|---|
| JP | 8-314343 | A | 11/1996 |
| JP | 11-212418 | A | 8/1999 |

* cited by examiner

*Primary Examiner* — Thao T. Tran

(74) *Attorney, Agent, or Firm* — Fitzpatrick, Cella, Harper & Scinto

(57) ABSTRACT

A blade for an electrophotographic apparatus is provided which is prevented from turning up, achieves wear resistance, and has excellent cleaning properties. The blade is composed of a support member and a blade member formed of a thermosetting polyurethane elastomer, which are joined together. The blade member has a structure in which a nitrogen concentration continuously increases from the inside of a contact part coming into contact with a counterpart member toward the surface of the contact part.

9 Claims, No Drawings

BLADE FOR ELECTROPHOTOGRAPHIC APPARATUS, AND METHOD OF PRODUCING THE SAME

BACKGROUND OF THE INVENTION

1. Field of the Invention

The present invention relates to a method of producing a blade for an electrophotographic apparatus used in an electrophotographic apparatus and to a blade for an electrophotographic apparatus.

2. Description of the Related Art

In general, an electrophotographic apparatus is structured such that a toner image on a photosensitive drum is transferred to a recording sheet, the toner remaining on the photosensitive drum is removed, and then transfer is repeatedly performed using the photosensitive drum. Therefore, the electrophotographic apparatus is provided inside with a cleaning blade in which a blade member is joined to a support, a developing blade which forms a thin layer while triboelectrically charging a toner in a developing assembly, etc.

In the cleaning blade, a holder formed of metal for attaching the blade to the electrophotographic apparatus or the like and the blade member which is formed of an elastic material and attached to one side of the holder are integrally formed. As a material forming the blade member, a thermosetting polyurethane elastomer is usually used because the degree of each of the wear resistance and the permanent deformation or the like is excellent.

However, when a conventional blade formed of a thermosetting polyurethane elastomer is used, the friction coefficient between the blade member and the photosensitive drum has increased in some cases. As a result, the blade is turned up; an abnormal noise is generated; and the driving torque of the photosensitive drum is required to be increased. Moreover, in recent years, since the processing speed increases, such problems tend to more remarkably occur.

Thus, various methods have been attempted so as to prevent the blade from turning up due to friction between the blade and the photosensitive drum.

(1) As the first method, a method is given involving coating the surface of the blade with lubricant powder.

(2) As the second method, a method is employed involving increasing the hardness throughout a thermosetting polyurethane elastomer which is a blade material to thereby reduce the friction.

(3) As the third method, a method is given involving reducing the friction of only the surface of the blade member formed of a thermosetting polyurethane elastomer to thereby maintain the elasticity throughout the blade. Specifically, according to this method, the blade member is coated with polysilazane to thereby reduce the friction of only the surface of the blade member (see, for example, Japanese Patent Application Laid-Open No. H08-314343).

In contrast, as a different problem from the above, when a cleaning blade formed of a polyurethane elastomer is used, the contact part has been chipped off in some cases because the blade is repeatedly rubbed with the photosensitive drum. In this case, a problem arises in that toner escapes from the chipped part, resulting in poor cleaning. Thus, in order to improve the wear resistance, it has been proposed that the crosslinking density in a polyurethane elastomer is adjusted to $8.5\times10^{-4}$ to $11.0\times10^{-4}$ mol/cm$^3$ (see, for example, Japanese Patent Application Laid-Open No. H11-212418).

SUMMARY OF THE INVENTION (1) The above-mentioned first method has posed the following problems: a uniform coating is difficult; the coating is likely to separate and durability is poor; and a halogenated organic solvent having a considerable influence on the environment is used at the time of application.

(2) The second method has posed problems in that when the hardness is lowered to achieve reduction in friction, a photosensitive drum and a developing roller are damaged and the rubber elasticity required for the blade becomes insufficient, deteriorating the performance of the blade.

(3) The third method has posed a problem in that since the surface of a thermosetting polyurethane elastomer is coated with another material, the effect of reducing the friction is insufficient, so that, for example, a coating film comes off during use. Moreover, in this method, the blade member is formed of two materials of a coating film and a thermosetting polyurethane elastomer which are different from each other in their properties. Therefore, the behavior when the blade comes in contact with the photosensitive drum is different between the coating film and the thermosetting polyurethane elastomer, giving rise to a problem in that a stable contact condition between the components is not achieved.

Moreover, in the method described in Japanese Patent Application Laid-Open No. H11-212418, the wear resistance is slightly improved, but the effect of reducing the friction is insufficient in some cases.

The present invention has been made in view of the above-mentioned problems. More specifically, the present invention aims to provide a blade for an electrophotographic apparatus which is prevented from turning up and also achieves wear resistance by creating a blade member in which the nitrogen concentration continuously increases from the inside of the contact part to the surface (A part) of the contact part. Moreover, the present invention aims to provide a blade for an electrophotographic apparatus which is excellent in contact properties to a photosensitive drum due to such a blade member.

In order to achieve the above-mentioned objects, the present invention has the following constitutions:

1. a blade for an electrophotographic apparatus including a support member and a blade member formed of a thermosetting polyurethane elastomer, joined to the support member, wherein a nitrogen concentration continuously increases from the inside of a contact part coming into contact with a counterpart member toward the surface (A part) of the contact part;

2. the blade for an electrophotographic apparatus according to the above 1, wherein the nitrogen concentration of at least the surface (A part) of the contact part is 1.0 wt % or more and 20.0 wt % or less; and the difference in the nitrogen concentration between the surface (A part) of the contact part and a 0.5 mm inside position (B part) from the A part in a thickness direction perpendicular to the surface is 0.2 wt % or more;

3. The blade for an electrophotographic apparatus according to the above 1 or 2, wherein the nitrogen concentration at the B part is 0.7 wt % or more and 10.0 wt % or less;

4. The blade for an electrophotographic apparatus according to any one of the above 1 to 3, wherein unevenness of the surface (A part) of the contact part are 10 μm or less;

5. A method of producing a blade for an electrophotographic apparatus according to any one of the above 1 to 4 in which a blade member formed of a thermosetting polyurethane elastomer is joined to a support member, including: a molding process; and an aging process including an aging period extending from the end of the molding process until using the blade, wherein the molding process includes the following steps (1) to (3):

(1) bringing the isocyanate compound into contact with the blade member formed of a polyurethane elastomer, (2) impregnating the isocyanate compound into the blade member by allowing the isocyanate compound to stand in contact with the surface of the blade member, and (3) removing the isocyanate compound remaining on the surface of the blade member after the impregnation in the step (2);

a viscosity of an isocyanate compound as contacted with the blade member is 800 mPa·s or lower; and a contact angle of the isocyanate compound as contacted with the blade member is 50° or lower;

6. The method of producing a blade for an electrophotographic apparatus according to the above 5, including forming the blade member in such a manner that the concentration of unreacted isocyanate groups represented by Equation (1) below in the aging process until 5 minutes have passed after completion of the step (3) ensures that the concentration of the unreacted isocyanate groups of an A part, which is the surface of the contact part, is higher than the concentration of the unreacted isocyanate groups of a B part at a 0.5 mm inside position from the A part in a thickness direction perpendicular to the surface:

(Equation 1)

$$\text{Concentration of unreacted isocyanate groups} = \text{Absorbance } \nu(\text{NCO}) \text{ at } 2{,}260\ \text{cm}^{-1} / \text{Absorbance } \nu(\text{C—H}) \text{ at } 2{,}950\ \text{cm}^{-1} \quad (1);$$

7. The method of producing a blade for an electrophotographic apparatus according to the above 6, wherein the blade member is formed in such a manner that, in the aging process until 5 minutes have passed after completion of the step (3), the difference in the concentration of unreacted isocyanate groups represented by Equation (1) above between the A part and the B part is 0.10 or more, with the difference being found by subtracting the concentration of the unreacted isocyanate groups at the B part from the concentration of the unreacted isocyanate groups at the A part;

8. The method of producing a blade for an electrophotographic apparatus according to any one of the above 5 to 7, wherein, in the step (2), the isocyanate compound is brought into contact with the blade member by application or dipping;

9. The method of producing a blade for an electrophotographic apparatus according to any one of the above 5 to 8, wherein, in the step (3), the isocyanate compound remaining on the surface of the blade member is removed by dissolving the isocyanate compound in a solvent capable of dissolving the isocyanate compound; and 10. The method of producing a blade for an electrophotographic apparatus according to any one of the above 5 to 9, further including, after the step (3), deactivating the unreacted isocyanate groups in the blade member by bringing an active hydrogen compound into contact with the surface of the blade member.

The present invention can provide a blade for an electrophotographic apparatus which is prevented from turning up and also achieves wear resistance and which has excellent blade performance (properties of cleaning residual toner on a photosensitive drum and the like).

Further features of the present invention will become apparent from the following description of exemplary embodiments.

DESCRIPTION OF THE EMBODIMENTS

Preferred embodiments of the present invention will be described below in detail.

The present invention relates to a blade for an electrophotographic apparatus in which a blade member formed of a thermosetting polyurethane elastomer is joined to a support member. The blade for an electrophotographic apparatus is characterized in that the nitrogen concentration continuously increases from the inside of the contact part in contact with a counterpart member toward the surface of the contact part. More specifically, the blade for an electrophotographic apparatus has a structure in which the hard segment concentration continuously increases from the inside of the contact part toward the surface. Therefore, the inside of the contact part has elasticity inherent in urethane, while the hardness increases and the friction decreases toward the surface Moreover, since the surface is hard and has low friction, the load applied to the edge upon contacting decreases and the wear resistance is also improved. The inside of the contact part as used herein refers to parts other than the surface of the contact part.

Moreover, due to a structure in which the blade is not formed of materials having different properties unlike a coating and the nitrogen concentration continuously increases, the behavior upon contacting is stabilized. It should be noted that the phrase "the nitrogen concentration continuously increases" as used herein encompasses not only the case where the nitrogen concentration monotonously increases with the depth from the inside of the contact part but also the case where the nitrogen concentration is constant from the surface of the contact part to a certain depth, and then decreases with the depth from the certain depth. However, the case where the portion at which the concentration is constant accounts for most of the portion from the inside of the contact part to the surface (A part) of the contact part, is not encompassed by the phrase "the nitrogen concentration continuously increases".

The blade member formed of a polyurethane elastomer can be manufactured according to, for example, a prepolymer method or a semi-one-shot method using the above-mentioned materials.

The nitrogen concentration of the surface (A part) of the contact part is preferably 1.0 wt % or more and 20.0 wt % or less. This is because when the nitrogen concentration at the A part is 1.0 wt % or more, the effect of preventing the blade from turning up can be achieved and the wear resistance can be also improved due to reduced friction. When the nitrogen concentration is 20.0 wt % or lower, a contacting member is not damaged.

It is preferable that the difference in the nitrogen concentration between a 0.5 mm inside position (B part) from the surface (A part) of the contact part in the thickness direction perpendicular to the surface and the A part is 0.2 wt % or more. Moreover, it is preferable that the nitrogen concentration at the B part is 0.7 wt % or more and 10.0 wt % or less. When the difference in the nitrogen concentration between the A part and the B part is 0.2 wt % or more, the A part in contact with a counterpart member can be improved in low frictional properties and wear resistance which are insufficient in the polyurethane elastomer itself. Moreover, the B part can maintain properties inherent in the polyurethane elastomer, i.e., excellent flexibility and excellent elasticity. Further, when the nitrogen concentration at the B part is 0.7 wt % or more, the amount of hard segments required for wear resistance is sufficient. When the nitrogen concentration is 10.0 wt % or lower, a problem does not arise that the rubber elasticity required for cleaning becomes insufficient due to an excessive amount of hard segments.

Further, the present invention relates to a method of producing a blade for an electrophotographic apparatus in which a blade member formed of a thermosetting polyurethane elastomer is joined to a support member. It is preferable that the production method includes a molding process and an aging process including an aging period extending from the end of the molding process until using the blade, and the molding process includes the following steps (1) to (3):

(1) bringing the isocyanate compound into contact with the blade member formed of a polyurethane elastomer;

(2) impregnating the isocyanate compound into the blade member by allowing the isocyanate compound to stand in contact with the surface of the blade member; and (3) removing the isocyanate compound remaining on the surface of the blade member after the impregnation in (2) above.

In this case, it is preferable that the viscosity of the isocyanate compound as contacted with the blade member is 800 mPa·s or lower. Further, it is preferable that the contact angle of the isocyanate compound as contacted with the blade member having the surface of a polyurethane elastomer is 50° or lower.

The isocyanate compound can be brought into contact with the blade member formed of a polyurethane elastomer by application or dipping. There is no limitation on the application method of the isocyanate compound. For example, the isocyanate compound may be applied to the blade member by drop-by-drop addition, spraying, or using a brush-like tool.

Further, the isocyanate compound is impregnated into the blade member by allowing the isocyanate compound to stand in contact with the surface of the blade member. In the step (2) above, it is preferable that the viscosity of the isocyanate compound as contacted with the blade member is 800 mPa·s or lower. The lower the viscosity of the isocyanate compound is, the more easily the isocyanate compound is impregnated into the polyurethane elastomer of which the blade member is composed. When the viscosity of the isocyanate compound is 800 mPa·s or lower, the blade member can be impregnated with the isocyanate compound until the effect of reducing the friction is achieved.

Moreover, in the step (2) above, the contact angle of the isocyanate compound to the surface of the polyurethane elastomer of the blade member is preferably 50° or lower when being contacted with the blade member. This is because the lower the contact angle is, the more uniformly the isocyanate compound is spread out over the blade member to wet it. When the contact angle is 50° or lower, the blade member can be uniformly and evenly impregnated.

During the impregnation, the isocyanate compound impregnated into the blade member reacts with components (unreacted isocyanate groups, etc.) forming the blade member. As a result, the target blade member is formed. Moreover, during the step, the reaction ratio of polyols and the isocyanate compound increases in the whole of the blade member, and thus a thermosetting polyurethane elastomer having desired properties (elasticity, etc.) can be formed.

As the isocyanate compounds, any isocyanate compounds can be used without limitation insofar as the isocyanate compounds each have at least one isocyanate group per molecule and have the following properties:

The viscosity of the isocyanate compound as contacted with the blade member is 800 mPa·s or lower; and The contact angle of the isocyanate compound as contacted with the blade member having the surface of a polyurethane elastomer is 50° or lower.

As one of the isocyanate compounds, MTL (trade name: Millionate MTL; manufactured by Nippon Polyurethane Industry Co., Ltd.) may be exemplified.

Moreover, the isocyanate compound may be used in a state that it is diluted in a solvent insofar as the viscosity and contact angle are in the above-mentioned ranges. The use temperature of the isocyanate compound is not specifically limited insofar as being in the range in which the heat deterioration of the polyurethane elastomer and isocyanate groups is hard to cause.

The production method of the present invention includes removing the isocyanate compound remaining on the surface of the blade member after the impregnation. This is because when the isocyanate compound remains on the surface of the blade member, unevenness is formed on the contact part, resulting in non-uniform contact, and thus, toner is likely to escape. Therefore, it is preferable to remove the isocyanate compound remaining on the surface of the blade member after the impregnation.

In the present invention, it is preferable that the concentration of unreacted isocyanate groups in the aging process until 5 minutes have passed after completion of the step (3), satisfies the relationship represented by the A part>the B part in terms of the IR absorbance ratio (unreacted isocyanate group concentration) represented by the following formula (2). The B part as used herein refers to a part at a 0.5 mm inside position from the A part in the thickness direction perpendicular to the surface of the A part.

(Equation 2)

Concentration of unreacted isocyanate groups=Absorbance of ν(NCO) absorption/Absorbance of ν(C—H) absorption (2)

In the production method of the present invention, the reaction is not completed only by the molding process, and unreacted isocyanate groups remain. Thus, the final physical properties are not achieved. Therefore, the aging process is carried out after the molding process. The residual quantity of the unreacted isocyanate groups at this time can be calculated as follows. The IR of a polyurethane elastomer is measured by ATR, and the residual quantity of the unreacted isocyanate groups can be calculated according to Equation (1) above from the absorbance of ν(NCO) and ν(C—H).

When the concentration of the unreacted isocyanate groups satisfies the relationship represented by the A part>the B part, i.e., when the concentration of the unreacted isocyanate groups of the surface (A part) of the contact part is higher than that of the inside (B part) of the contact part, the hard segment concentration is high. Therefore, the inside of the contact part has elasticity inherent in urethane, the surface is harder than the inside, and the friction is reduced.

Moreover, it is preferable that, in the aging process until 5 minutes have passed after completion of the step (3), the difference in the concentration of the unreacted isocyanate groups between the A part and the B part represented by Equation (1) above is 0.10 or more. When the difference in the concentration of the unreacted isocyanate groups ((the concentration of the unreacted isocyanate groups at the A part)−(the concentration of the unreacted isocyanate groups at the B part)) is 0.10 or more, the difference in the hardness from the inside is sufficient and the excellent effect of reducing the friction can be achieved.

According to the production method of the present invention, the isocyanate compound remaining on the surface of the blade member is removed after the impregnation of step (2). The method of removing the isocyanate compound includes a method of wiping off the excessive isocyanate compound on the surface of the blade member with a sponge or the like having hardness with which the blade member formed of a thermosetting polyurethane elastomer is not damaged.

Moreover, when removing the isocyanate compound remaining on the surface of the blade member, a solvent capable of dissolving the isocyanate compound may be used. Such a solvent includes toluene, xylene, butyl acetate, methyl ethyl ketone, etc. The isocyanate compound is dissolved in a solvent capable of dissolving the isocyanate compound as described above, whereby the isocyanate compound can be efficiently removed.

By sufficiently removing the isocyanate compound remaining on the surface of a cleaning blade, the unevenness (ten-Point average height Rzjis) of the contact part can be adjusted to 10 μm or lower, and the edge accuracy of the contact part can be secured.

In the present invention, it is preferable to include a step of bringing an active hydrogen compound into contact with the surface of the blade member to thereby deactivate the unreacted isocyanate groups in the blade member in the aging process after the step (3). The active hydrogen compound is not specifically limited, and has only to contain at least one functional group having active hydrogen per molecule. An active hydrogen compound requiring no washing process after the aging process is preferable. Thus, monohydric alcohols and monoamines are cited as compounds having a low molecular weight and high volatility, and water is most preferable.

There is no specific limitation on the method of bringing the active hydrogen compound into contact with the surface of the blade member, and application, dipping, etc. are cited. When using water, the blade member can be aged simply by allowing it to stand in an environment with certain humidity.

The thermosetting polyurethane elastomer forming the blade member mainly contains a polyisocyanate compound, a high molecular weight polyol, a chain extender which is a low molecular weight polyol such as a bifunctional polyol and trifunctional polyol, and a catalyst.

Examples of the polyisocyanate compound include 4,4'-diphenylmethane diisocyanate (MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophoron diisocyanate (IPDI), 4,4'-dicyclohexylmethane diisocyanate (hydrogenated MDI), tetramethylxylene diisocyanate (TMXDI), carbodiimide-modified MDI, and polymethylene phenylpolyisocyanate (PAPI). Of those, MDI is preferably used.

The above-mentioned high molecular weight polyol are polyester polyol, polyether polyol, caprolactone ester polyol, polycarbonate ester polyol, silicone polyol, etc. Moreover, the number average molecular weight of the high molecular weight polyol is preferably 1,500 to 4,000. This is because when the number average molecular weight is 1,500 or more, the physical properties of a polyurethane elastomer to be obtained are excellent. When the number average molecular weight is 4,000 or lower, the viscosity is appropriate and handling is easy, and thus, the above-mentioned range is preferable.

As the chain extender, for example, a glycol is used. Examples of the glycol include ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol.

In addition to the glycol, a polyalcohol may be used. Examples of the polyalcohol include trimethylolpropane, glycerin, pentaerythritol, and sorbitol. Those may be used singly or in combination.

As the above-mentioned catalyst, a generally-used catalyst for curing a polyurethane elastomer can be used, and, for example, a tertiary amine catalyst may be cited. Specifically, the following may be exemplified: amino alcohols such as dimethylethanolamine, trialkylamines such as triethylamine, tetraalkyl diamine such as N,N,N',N'-tetramethyl-1,3-butanediamine, triethylenediamine, piperazines, triazines, etc. Moreover, a metal catalyst generally used for a polyurethane elastomer may be usable, and dibutyltin dilaurate, etc. can be cited.

Moreover, additives such as a catalyst, pigment, plasticizer, waterproofing agent, antioxidant, UV absorber and light stabilizer may be blended as required.

The blade for an electrophotographic apparatus according to the present invention is used as a cleaning blade, a developing blade and the like of electrophotographic apparatuses to which the electrophotographic technology is applied, such as a copying machine, laser beam printer, LED printer and electrophotographic plate making system. The blade for an electrophotographic apparatus has a structure in which the blade member manufactured using a thermosetting polyurethane elastomer raw material composition and the support member are joined to each other. The shapes of the support member and the blade member are not specifically limited, and the support member and the blade member may be formed into shapes suitable for the purpose of use.

For example, the support member is placed in a die for a cleaning blade, the thermosetting polyurethane elastomer raw material composition is injected into a cavity, and the composition is then heated and cured. Thus, the cleaning blade of the present invention in which the blade member in the form of a plate and the support member are integrated can be obtained.

Moreover, a method is applicable which involves separately molding a sheet of a thermosetting polyurethane elastomer from the thermosetting polyurethane elastomer raw material composition; cutting the sheet into a strip to be used as a blade member; laminating an adhering part of the blade member to the support member to which an adhesive is applied or stuck, and heating pressurizing the resultant for adhesion.

There is no specific limitation on the material forming the support member, and metal and resin may be cited. More specifically, the support member can be produced from metal materials such as a steel sheet, a stainless steel sheet, a zinc-plating chromate film steel sheet and a chromium-free steel sheet, and resin materials such as 6-nylon and 6,6-nylon.

The support member and the blade member are jointed to each other by any methods without limitation, and a suitable method may be selected from known methods. Specifically, a method may be cited in which adhesion is carried out using an adhesive such as phenol resin.

EXAMPLES

Hereinafter, the present invention will be described with reference to Examples, but is not limited thereto.

Example 1

(Molding of a Cleaning Blade)

A holder (support member) to which a phenol adhesive was beforehand applied on one side at one end was prepared.

Next, a forming die for a cleaning blade was prepared, and then the holder was placed in a cavity for forming a blade member of the die in a state that the one side at one end of the holder is projected.

296.6 g of 4,4'-diphenylmethane diisocyanate and 703.4 g of polybutylene adipate polyester polyol having a number average molecular weight of 2,000 were reacted at 80° C. for 3 hours to produce a prepolymer whose NCO % was 7.00%. The prepolymer was mixed with 39.1 g of 1,4-butanediol, 21.0 g of trimethylolpropane, 0.06 g of DABCO P15 (EG solution of potassium acetate, manufactured by Air Products Japan, Inc.), and a curing agent in which 0.18 g of TEDA was added. The mixture was injected into the die, and was cured at 130° C. for 5 minutes. Then, the cured product was released from the die, and cut to form an edge of the contact part.

Next, MTL (trade name: Millionate MTL; manufactured by Nippon Polyurethane Industry Co., Ltd.) was applied (25° C.) as an isocyanate compound to the cut surface, and was allowed to stand for 30 minutes in contact with the blade member (25° C.). Thereafter, an excessive isocyanate compound remaining on the surface of the blade member was removed with a sponge. Then, finishing wiping was further performed with a sponge containing a small amount of butyl acetate. After that, the resultant was allowed to stand at a temperature of 25° C. and a humidity of 50% for 24 hours for aging.

(Viscosity of Isocyanate Compound)

The viscosity of an isocyanate compound was measured with a SV viscometer SV-10 manufactured by A&D Co., Ltd. at a temperature (25° C.) at which the compound was brought into contact with the blade member. As a result, the viscosity of MTL was 50 mPa·s.

(Contact Angle of Isocyanate Compound when Being Contacted with Blade Member)

The contact angle of the isocyanate compound to the blade member was measured with Model CA-X manufactured by Kyowa Interface Science Co., Ltd. at a temperature (25° C.) at which the compound was brought into contact with the blade member. As a result, the contact angle of MTL was 25°.

(Method of Measuring Residual Quantity of Unreacted Isocyanate Groups after Molding Process)

The IR of a polyurethane elastomer part 2 minutes after the molding process was measured with NEXUS470 manufactured by Thermo Electron Co., Ltd. The measurement was performed at two points: the A part on the surface of the blade and the B part at a 0.5 mm inside position in the thickness direction perpendicular to the surface of the A part (45% of the use part thickness of 2.0 mm). The residual quantity of unreacted isocyanate groups was calculated according to Equation (1) below from the absorbance ratio of ν(C—H) at 2,950 $cm^{-1}$ and ν(NCO) at 2,260 $cm^{-1}$ of the obtained spectra. As a result, the residual quantity of unreacted isocyanate groups was 5.0 at the A part, and 0.25 at the inside, and thus the difference between the A part and the B part was 4.75.

(Equation 1)

$$\text{Concentration of unreacted isocyanate group} = \text{Absorbance } \nu(\text{NCO}) \text{ at } 2{,}260\ \text{cm}^{-1} / \text{Absorbance } \nu(\text{C—H}) \text{ at } 2{,}950\ \text{cm}^{-1} \quad (1)$$

(Measurement of Nitrogen Concentration)

Measurement was performed using an electron probe microanalyzer EPMA1610 manufactured by Shimadzu corporation. For the measurement, a blade member that had been aged for 24 hours was used. As a result, the nitrogen concentration was as follows: the surface (A part) of the contact part: 3.6 wt %; the part at a 0.02 mm inside position from the surface of the contact part in the thickness direction perpendicular to the surface: 1.4 wt %; the part at a 0.05 mm inside position from the surface of the contact part in the thickness direction perpendicular to the surface: 1.2 wt %; and the part at a 0.50 mm inside position (B part) from the surface of the contact part in the thickness direction perpendicular to the surface: 1.1 wt %.

Thus, it was confirmed that the nitrogen concentration was continuously increased from the inside of the contact part toward the surface. Moreover, the difference between the A part which is the surface of the contact part and the B part at a 0.50 mm inside position from the contact part surface was 2.5 wt %.

(Ten-Point Average Height Rzjis)

Measurement was performed using a surface roughness measuring instrument surfcoder (SE3500: manufactured by Kosaka Laboratory Ltd.). The Rzjis was 0.8 μm.

(Friction Coefficient)

Measurement was performed using Heidon Surface Property Tester manufactured by Shinto Kagaku K.K. The measurement was performed using a 2 mm thick sheet, which was produced under the same conditions as in the cleaning blade, after aged for 24 hours. A ball indenter made of stainless steel to which a load of 0.1 kg was applied was brought into contact with the sheet. Then, measurement was performed while moving the ball indenter at 50 mm/minute. As a result, the friction coefficient was 0.7.

(Practical Evaluation)

The cleaning blade obtained as described above was installed in a laser beam printer (trade name: Canon LBP2510), and a durability test was performed in a room temperature environment.

A 10,000-sheet durability test was performed, and evaluation was made according to the following criteria: "A": No turning up and no poor cleaning occurred and "B": Turning up occurred and the wear resistance was insufficient, and thus the edge was chipped, resulting in poor cleaning.

Example 2

A cleaning blade was produced following the procedure of Example 1 except doubling the time of being allowed to stand after the application of MTL (i.e., 60 minutes). The nitrogen concentration of the blade member was as follows:

the surface (A part) of the contact part: 5.1 wt %;

the part at a 0.02 mm inside position from the surface of the contact part in the thickness direction perpendicular to the surface: 1.8 wt %;

the part at a 0.05 mm inside position from the surface of the contact part in the thickness direction perpendicular to the surface: 1.3 wt %; and the part at a 0.50 mm inside position (B part) from the surface of the contact part in the thickness direction perpendicular to the surface: 1.1 wt %.

Thus, it was confirmed that the nitrogen concentration was continuously increased from the inside of the contact part toward the surface. Moreover, the difference in the nitrogen concentration between the A part and the B part was 4.0 wt %.

The residual quantity of unreacted isocyanate groups was 6.7 at the A part, and 0.24 at the B part, and thus the difference between the A part and the B part was 6.46. The Rzjis was 0.8 and the friction coefficient was 0.5. Moreover, the practical evaluation showed that no turning up and no poor cleaning occurred, i.e., "A".

Example 3

A cleaning blade was produced following the procedure of Example 1 except diluting MTL with MEK. In this case, the viscosity of the MEK solution of MTL was 1.3 mPa·s and the contact angle was 20°. The nitrogen concentration of the blade member was as follows:

the surface (A part) of the contact part: 3.2 wt %;

the part at a 0.02 mm inside position from the surface of the contact part in the thickness direction perpendicular to the surface: 1.5 wt %;

the part at a 0.05 mm inside position from the surface of the contact part in the thickness direction perpendicular to the surface: 1.2 wt %; and the part at a 0.50 mm inside position (B part) from the surface of the contact part in the thickness direction perpendicular to the surface: 1.1 wt %.

The difference in the nitrogen concentration between the A part and the B part was 2.1 wt %. Thus, it was confirmed that the nitrogen concentration was continuously increased from the inside of the contact part toward the surface.

The residual quantity of unreacted isocyanate groups, the A part was 4.2, the B part was 0.25, and thus the difference between the A part and the B part was 3.95.

The Rzjis was 0.8 and the friction coefficient was 0.7.

The practical evaluation showed that no turning up and no poor cleaning occurred, i.e., "A"

Example 4

A cleaning blade was produced following the procedure of Example 1 except using, as the isocyanate compound, polymeric MDI in place of MTL. The viscosity of the polymeric MDI was 700 mPa·s, and the contact angle was 27°. The nitrogen concentration of the blade member was as follows:

the surface (A part) of the contact part: 3.1 wt % the part at a 0.02 mm inside position from the surface of the contact part in the thickness direction perpendicular to the surface: 1.2 wt %;

the part at a 0.05 mm inside position from the surface of the contact part in the thickness direction perpendicular to the surface: 1.1 wt %; and the part at a 0.50 mm inside position (B part) from the surface of the contact part in the thickness direction perpendicular to the surface: 1.1 wt %.

Thus, it was confirmed that the nitrogen concentration was continuously increased from the inside of the contact part toward the surface. Moreover, the difference in the nitrogen concentration between the A part and the B part was 2.0 wt %.

The residual quantity of unreacted isocyanate groups was 4.3 at the A part, and 0.25 at the B part, and thus the difference between the A part and the B part was 4.05.

The Rzjis was 1.0 and the friction coefficient was 1.0. The practical evaluation showed that no turning up and no poor cleaning occurred, i.e., "A"

Example 5

A cleaning blade was produced following the procedure of Example 1 except changing the method of contacting the isocyanate compound from application method to dipping. The nitrogen concentration of the blade member was as follows:

the surface (A part) of the contact part: 3.7 wt %;

the part at a 0.02 mm inside position from the surface of the contact part in the thickness direction perpendicular to the surface: 1.5 wt %;

the part at a 0.05 mm inside position from the surface of the contact part in the thickness direction perpendicular to the surface: 1.2 wt %; and the part at a 0.50 mm inside position (B part) from the surface of the contact part in the thickness direction perpendicular to the surface: 1.1 wt %.

Thus, it was confirmed that the nitrogen concentration was continuously increased from the inside of the contact part toward the surface. Moreover, the difference in the nitrogen concentration between the A part and the B part was 2.6 wt %.

The residual quantity of unreacted isocyanate groups was 5.2 at the A part, and 0.25 at the B part, and thus the difference between the A part and the B part was 4.95.

The Rzjis was 0.8 and the friction coefficient was 0.7. The practical evaluation showed that no turning up and no poor cleaning occurred, i.e., "A".

Comparative Example 1

A cleaning blade was produced following the procedure of Example 1 except not performing the steps following the impregnation of the isocyanate compound. The nitrogen concentration of the blade member was as follows:

the surface (A part) of the contact part: 1.1 wt %;

The part at a 0.02 mm inside position from the surface of the contact part in the thickness direction perpendicular to the surface: 1.1 wt %;

the part at a 0.05 mm inside position from the surface of the contact part in the thickness direction perpendicular to the surface: 1.1 wt %; and the part at a 0.50 mm inside position (B part) from the surface of the contact part in the thickness direction perpendicular to the surface: 1.1 wt %.

Therefore, the difference in the nitrogen concentration between the surface of the contact part and the inside thereof was not found.

The residual quantity of unreacted isocyanate groups was 0.25 at the A part, and 0.25 at the B part, and thus there was no difference between the A part and the B part.

The Rzjis was 0.5 and the friction coefficient was 3.2.

The practical evaluation showed that when 500 sheets were passed, turning up occurred. Therefore, it was not confirmed whether poor cleaning occurred when 10,000 sheets were passed.

Comparative Example 2

A cleaning blade was produced following the procedure of Example 1 until the cured product was released. Thereafter, the cleaning blade was dipped into a substance obtained by diluting a prepolymer whose NCO % was 15.0% (trade name: coronate 2041; manufactured by Nippon Polyurethane Industry Co., Ltd.) with butyl acetate at 25° C. for 1 minute, and dried at 50° C. for 3 hours. Then, the resultant was cut to form an edge. The nitrogen concentration of the blade member was as follows:

the surface (A part) of the contact part: 5.0 wt %;

the part at a 0.02 mm inside position from the surface of the contact part in the thickness direction perpendicular to the surface: 5.0 wt %;

the part at a 0.05 mm inside position from the surface of the contact part in the thickness direction perpendicular to the surface: 1.1 wt %; and the part at a 0.50 mm inside position (B part) from the surface of the contact part in the thickness direction perpendicular to the surface: 1.1 wt %.

In the cleaning blade, the nitrogen concentration was 1.1 wt % in the area from a 0.05 mm inside position to a 0.5 mm inside position from the surface of the contact part, and thus the difference in the nitrogen concentration was not found in most of the part. The difference between the A part and the B part was 3.9.

The residual quantity of unreacted isocyanate groups was 6.0 at the A part, and 0.25 at the B part, and thus the difference between the A part and the B part was 5.75. The Rzjis was 1.3 and the friction coefficient was 0.8.

The practical evaluation showed that no turning up occurred, but poor cleaning occurred when 3,000 sheets were passed. After the practical evaluation, the part where poor cleaning occurred was observed, and it was found that the coating had been peeled off.

TABLE 1

| | | Example 1 | Example 2 | Example 3 |
|---|---|---|---|---|
| Thermosetting polyurethane elastomer composition | 4,4'-MDI (g) | 296.6 | ← | ← |
| | PBA2000 (g) | 703.4 | ← | ← |
| | 1,4-BD (g) | 39.1 | ← | ← |
| | TMP (g) | 21.0 | ← | ← |
| | P15 (g) | 0.06 | ← | ← |
| | TEDA (g) | 0.18 | ← | ← |
| Impregnation step | Isocyanate compound | MTL | ← | |
| | Dilution solvent | No | ← | MEK |
| | Viscosity (mPa · s) | 50 | ← | 1.3 |
| | Contact angle (°) | 25 | ← | 20 |
| | Method of contacting compound | Application | ← | ← |
| | Temperature (° C.) | 25 | ← | ← |
| | Contact time (minute) | 30 | 60 | 30 |
| | Wiping solvent | Butyl acetate | ← | ← |
| Nitrogen concentration of blade member (wt %) | Surface (A part) | 3.6 | 5.1 | 3.2 |
| | 0.02 mm inside | 1.4 | 1.8 | 1.5 |
| | 0.05 mm inside | 1.2 | 1.3 | 1.2 |
| | 0.50 mm inside (B Part) | 1.1 | 1.1 | 1.1 |
| | Difference between A part and B part | 2.5 | 4.0 | 2.1 |
| Concentration of unreacted isocyanate group | Surface (A part) | 5.0 | 6.7 | 4.2 |
| | 0.50 mm inside (B Part) | 0.25 | 0.24 | 0.25 |
| | Difference between A part and B part | 4.75 | 6.46 | 3.95 |
| | Rzjis (μm) | 0.8 | 0.8 | 0.8 |
| | Friction coefficient | 0.7 | 0.5 | 0.7 |
| Practical evaluation | Turning up | A | A | A |
| | Poor cleaning (Wear resistance) | A | A | A |

4,4'-MDI: 4,4'-diphenylmethane diisocyanate
PBA2000: polybutylene adipate polyester polyol having a number average molecular weight of 2,000
1,4-BD: 1,4-butanediol
TMP: trimethylolpropane
P15: ethylene glycol solution of potassium acetate (manufactured by Air Products and Chemicals, Inc.)
TEDA: triethylenediamine
MTL: MILLIONATE MTL (manufactured by NIPPON POLYURETHANE INDUSTRY CO., LTD.)
poly-MDI: Polymeric MDI
MEK: methylethyl ketone

TABLE 2

| | | Example 4 | Example 5 | Comparative Example 1 | Comparative Example 2 |
|---|---|---|---|---|---|
| Thermosetting polyurethane elastomer composition | 4,4'-MDI (g) | 296.6 | ← | ← | ← |
| | PBA2000 (g) | 703.4 | ← | ← | ← |
| | 1,4-BD (g) | 39.1 | ← | ← | ← |
| | TMP (g) | 21.0 | ← | ← | ← |
| | P15 (g) | 0.06 | ← | ← | ← |
| | TEDA (g) | 0.18 | ← | ← | ← |
| Impregnation step | Isocyanate compound | Poly-MDI | MTL | No | Prepolymer |
| | Dilution solvent | No | ← | No | Butyl acetate |
| | Viscosity (mPa · s) | 700 | 50 | No | 200 |
| | Contact angle (°) | 27 | 25 | No | 26 |
| | Method of contacting compound | Application | Dipping | No | Dipping |
| | Temperature (° C.) | 25 | ← | No | 25 |
| | Contact time (minute) | 30 | 30 | No | 1 |
| | Wiping solvent | Butyl acetate | ← | No | ← |
| Nitrogen concentration of | Surface (A part) | 3.1 | 3.7 | 1.1 | 5.0 |
| | 0.02 mm inside | 1.2 | 1.5 | 1.1 | 5.0 |

TABLE 2-continued

| | | Example 4 | Example 5 | Comparative Example 1 | Comparative Example 2 |
|---|---|---|---|---|---|
| blade member (wt %) | 0.05 mm inside | 1.1 | 1.2 | 1.1 | 1.1 |
| | 0.50 mm inside (B Part) | 1.1 | 1.1 | 1.1 | 1.1 |
| | Difference between A part and B part | 2.0 | 2.5 | 0 | 3.9 |
| Concentration of unreacted isocyanate group | Surface (A part) | 4.3 | 5.2 | 0.25 | 6.0 |
| | 0.50 mm inside (B Part) | 0.25 | 0.25 | 0.25 | 0.25 |
| | Difference between A part and B part | 4.05 | 4.95 | 0 | 5.75 |
| Rzjis (μm) | | 1.0 | 0.8 | 0.5 | 1.3 |
| Friction coefficient | | 1.0 | 0.7 | 3.2 | 0.8 |
| Practical evaluation | Turning up | A | A | B | A |
| | Poor cleaning (Wear resistance) | A | A | — | B (Peeling-off of coating) |

4,4'-MDI: 4,4'-diphenylmethane diisocyanate
PBA2000: polybutylene adipate polyester polyol having a number average molecular weight of 2,000
1,4-BD: 1,4-butanediol
TMP: trimethylolpropane
P15: ethylene glycol solution of potassium acetate (manufactured by Air Products and Chemicals, Inc.)
TEDA: triethylene diamine
MTL: MILLIONATE MTL (manufactured by NIPPON POLYURETHANE INDUSTRY CO., LTD.)
poly-MDI: Polymeric MDI
MEK: methylethyl ketone In Examples 1 to 5, the surface (A part) of the contact part is higher in the residual quantity of the unreacted isocyanate groups after the molding process than the inside (B part). The nitrogen concentration is continuously increased from the inside (B part) of the contact part toward the surface (A part) of the contact part. Therefore, it is revealed that the hard segment increases and the friction decreases in the surface of the cleaning blade while the inside of the cleaning blade retains the rubber elasticity inherent in a polyurethane elastomer. In addition, the friction coefficients in Examples 1 to 5 are 1.0 or lower, whereas the friction coefficient in Comparative Example 1 in which no treatment with an isocyanate compound was performed was 3.2.

The practical evaluation showed that turning up occurred in Comparative Example 1, but no turning up occurred in Examples 1 to 5 even when 10,000 sheets were passed. In Comparative Example 2, the friction coefficient was as low as 0.8 and no turning up occurred, but poor cleaning occurred due to the peeling-off of coating. The reason is considered to be that the blade member is composed of two parts different in properties, and thus, when being contacted, the behavior differs in each part, and the peeling-off of coating occurs due to repeated rubbing. In addition, it has been revealed that in Comparative Example 2, the nitrogen concentration abruptly changes at a certain point due to the coating, but in Examples 1 to 5, since the blade member have a structure in which the nitrogen concentration continuously changes, such a problem does not occur and the wear resistance is also improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-186880, filed Jul. 18, 2007, which is hereby incorporated by reference herein in its entirety.

What is claimed is:

1. A blade for an electrophotographic apparatus, comprising:

a support member; and a blade member formed of a thermosetting polyurethane elastomer, joined to the support member, wherein a nitrogen concentration in the blade member continuously increases from an inside of a contact part of the blade member coming into contact with a counterpart member toward a surface (A part) of the contact part of the blade member, wherein the nitrogen concentration of at least the surface (A part) of the contact part is 1.0 wt % or more and 20.0 wt % or less, and wherein a difference in the nitrogen concentration between the surface (A part) of the contact part and a 0.5 mm inside position (B part) from the surface (A part) in a thickness direction perpendicular to the surface is 0.2 wt % or more.

2. The blade for an electrophotographic apparatus according to claim 1, wherein the nitrogen concentration at the inside position (B part) is 0.7 wt % or more and 10.0 wt % or less.

3. The blade for an electrophotographic apparatus according to claim 1, wherein unevenness of the surface (A part) of the contact part is 10 μm or less.

4. A method of producing a blade for an electrophotographic apparatus according to claim 1 comprising a support member and a blade member formed of a thermosetting polyurethane elastomer, joined to the support member, the method comprising:

a molding process; and an aging process including an aging period extending from the end of the molding process until using the blade, wherein the molding process includes:

a first step of bringing an isocyanate compound into contact with the blade member formed of a polyurethane elastomer, a second step of impregnating the isocyanate compound into the blade member by allowing the isocyanate compound to stand in contact with the surface of the blade member, and a third step of removing the isocyanate compound remaining on the surface of the blade member after the impregnation in the second step, wherein the viscosity of an isocyanate compound as contacted with the blade member is 800 mPa·s or lower, and wherein a contact angle of the isocyanate compound as contacted with the blade member is 50° or lower.

5. The method of producing a blade for an electrophotographic apparatus according to claim 4, comprising forming the blade member in such a manner that a concentration of an unreacted isocyanate group represented by Equation (1) in the aging process until 5 minutes have passed after completion of the third step ensures that a concentration of the unreacted isocyanate group of the surface (A part) of the contact part, is higher than a concentration of the unreacted isocyanate group of an 0.5 mm inside position (B part) from the surface (A part) in a thickness direction perpendicular to the surface:

$$\text{Concentration of unreacted isocyanate group} = \text{Absorbance } \nu(\text{NCO}) \text{ at } 2{,}260\ \text{cm}^{-1} / \text{Absorbance } \nu(\text{C—H}) \text{ at } 2{,}950\ \text{cm}^{-1} \quad (1).$$

6. The method of producing a blade for an electrophotographic apparatus according to claim 5, comprising forming the blade member in such a manner that, in the aging process until 5 minutes have passed after completion of the third step, a difference in the concentration of an unreacted isocyanate group represented by Equation (1) between the surface (A part) and the inside position (B part) is 0.10 or more, the difference determined by subtracting the concentration of the unreacted isocyanate group at the inside position (B part) from the concentration of the unreacted isocyanate group at the surface (A part).

7. The method of producing a blade for an electrophotographic apparatus according to claim 4, wherein, in the second step, the isocyanate compound is brought into contact with the blade member by application or dipping.

8. The method of producing a blade for an electrophotographic apparatus according to claim 4, wherein the third step includes removing the isocyanate compound remaining on the surface of the blade member by dissolving the isocyanate compound in a solvent capable of dissolving the isocyanate compound.

9. The method of producing a blade for an electrophotographic apparatus according to claim 4 further comprising, after the third step, deactivating the unreacted isocyanate group in the blade member by bringing an active hydrogen compound into contact with the surface of the blade member.

* * * * *